(12) United States Patent
Grodzins

(10) Patent No.: US 7,266,178 B2
(45) Date of Patent: Sep. 4, 2007

(54) CALIBRATION SOURCE FOR X-RAY DETECTORS

(75) Inventor: Hal Grodzins, Bedford, MA (US)

(73) Assignee: ThermoNITON Analyzers LLC, Billerica, MA (US)

( * ) Notice: Subject to any disclaimer, the term of this patent is extended or adjusted under 35 U.S.C. 154(b) by 0 days.

(21) Appl. No.: 10/440,703

(22) Filed: May 19, 2003

(65) Prior Publication Data

US 2003/0215052 A1    Nov. 20, 2003

Related U.S. Application Data

(60) Provisional application No. 60/381,412, filed on May 17, 2002.

(51) Int. Cl.
*H01J 35/00* (2006.01)
(52) U.S. Cl. ...................................... 378/122; 378/207
(58) Field of Classification Search ................ 378/119, 378/121, 122, 136, 207
See application file for complete search history.

(56) References Cited

U.S. PATENT DOCUMENTS

| | | | | |
|---|---|---|---|---|
| 3,198,944 A | * | 8/1965 | Furbee | 378/47 |
| 3,452,193 A | * | 6/1969 | Petersen | 378/53 |
| 3,840,748 A | | 10/1974 | Braunlich | 250/423 |
| 4,355,230 A | * | 10/1982 | Wilson et al. | 250/252.1 |
| 4,506,375 A | * | 3/1985 | Manson | 378/207 |
| 4,580,048 A | | 4/1986 | Dion | 250/256 |
| 5,054,043 A | * | 10/1991 | Lucas et al. | 378/89 |
| 5,206,174 A | * | 4/1993 | Gehrke et al. | 436/58 |
| 5,689,540 A | * | 11/1997 | Stephenson et al. | 378/53 |
| 5,936,249 A | * | 8/1999 | Eisen et al. | 250/370.06 |
| 6,087,656 A | * | 7/2000 | Kimmich et al. | 250/252.1 |
| 6,563,906 B2 | * | 5/2003 | Hussein et al. | 378/89 |
| 6,632,020 B2 | * | 10/2003 | Kaufhold et al. | 378/207 |

FOREIGN PATENT DOCUMENTS

EP     01/89645     8/1986

OTHER PUBLICATIONS http://web.archive.org/web/20021021125232/www.amptek.com/coolx.html Product disclosure, updated Sep. 20, 2002.*
Morgan, F. J., A. H. Gabriel and M. J. Barton "Absolute intensity calibration of a grazing-incidence spectrograph in the wavelength region 10-120 A" Journal of Physics E, Series 2, vol. 1, pp. 998-1002 (1968).*
Brownridge et al., "Investigation of Pyroelectric Generation of X-Rays", Journal of Applied Physics, 86, 640 (1990).
Brownridge, "Pyroelectric X-Ray Generator", Nature, vol. 358, 287-288 (1992).
Amptek Press Release, http://www.amptek.com/press.html (May 17, 2002).

* cited by examiner

*Primary Examiner*—Edward J. Glick
*Assistant Examiner*—Thomas R. Artman
(74) *Attorney, Agent, or Firm*—Bromberg & Sunstein LLP

(57) ABSTRACT

A method and device for calibrating the energy response of detectors of photons in the range from about 0.5 keV to at least 100 keV. The device makes use of the inherent property of a polarizable crystal such as a pyroelectric crystal to produce monoenergetic x-rays when the crystal is heated or cooled in a partial vacuum. Specific calibration energies of x-ray emission, may be selected for the application of the user by selection of a coating to the pyroelectric crystal and an external foil. The calibration device may be disposed within the same housing as a penetrating radiation detector.

7 Claims, 3 Drawing Sheets

CALIBRATION SOURCE FOR X-RAY DETECTORS

PRIORITY

This application claims priority from U.S. Provisional Patent Application No. 60/381,412, filed May 17, 2002, having the title "A Calibration Source for X-Ray Detectors" and incorporated by reference herein in its entirety.

TECHNICAL FIELD

The present invention relates to methods and devices for calibrating the energy response of detectors of penetrating radiation using solid-state electron acceleration and x-ray generation means.

BACKGROUND ART

X-ray based instruments are used in a wide variety of industries for many purposes. In those applications that require that the energy of the x-rays be accurately measured it is necessary to calibrate the energy response of the detector system. In some applications the calibration must be carried out at frequent intervals. The term 'x-ray' as used herein and in any appended claims applies to all photons in the range from about 0.5 keV to 100 keV and greater energies as well, encompassing all radiation capable of penetrating solid matter, whether originating from atomic or nuclear transitions in radioisotopes, x-ray tubes, plasma emitters, or any other source. Such radiation may also be referred to as 'penetrating radiation'.

The calibration of energy-dispersive instruments has traditionally used either a radioactive source or an x-ray tube. For example, the radioactive source may direct monoenergetic photons of precisely known energy into the detector, or, alternatively, a radioactive source or x-ray tube may induce fluorescence in a known target material and the monochromatic x-rays from the target may be directed into the detector. These traditional methods typically require that a calibration target be moved in and out of the x-ray beam path, or that a ponderous shield be positioned to intervene between the source and the calibration target. Radioactive calibration sources, which cannot be turned off, may require licensing and diligent safety procedures. It is thus desirable that a calibration source be capable of being interrupted when not in use for calibration.

SUMMARY OF THE INVENTION

In accordance with preferred embodiments of the present invention there is provided a method and a device for calibrating a detector of penetrating radiation. The method includes steps of:

enclosing a polarizable crystal characterized by a temperature within a partial vacuum in a hermetically sealed enclosure;

inducing a voltage between one face of the crystal and a foil held at an electrical potential different from that of the face of the crystal;

accelerating charged particles between the foil and the face of the crystal so that the charged particles impinge upon one of the face of the crystal and the foil to generate penetrating radiation of known characteristics;

directing the penetrating radiation onto a penetrating radiation detector thereby generating a detector signal; and calibrating the detector signal on the basis of the detector signal and the known characteristics of the penetrating radiation.

In accordance with further embodiments of the invention, the step of enclosing a crystal may include enclosing a crystal chosen from the group of pyroelectric crystals including lithium niobate, lithium tantalate, and cesium nitrate. The step of inducing a voltage between one face of the crystal and the foil may include changing the temperature of the crystal.

In further embodiments of the invention, a target is interposed between the face of the crystal and the detector for generating characteristic x-rays of specified energies, either within the hermetically sealed enclosure or outside it. Additionally, an absorber may be interposed between the target and the detector to be calibrated in order to attenuate bremsstrahlung radiation at energies above that of the characteristic radiation of the target.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
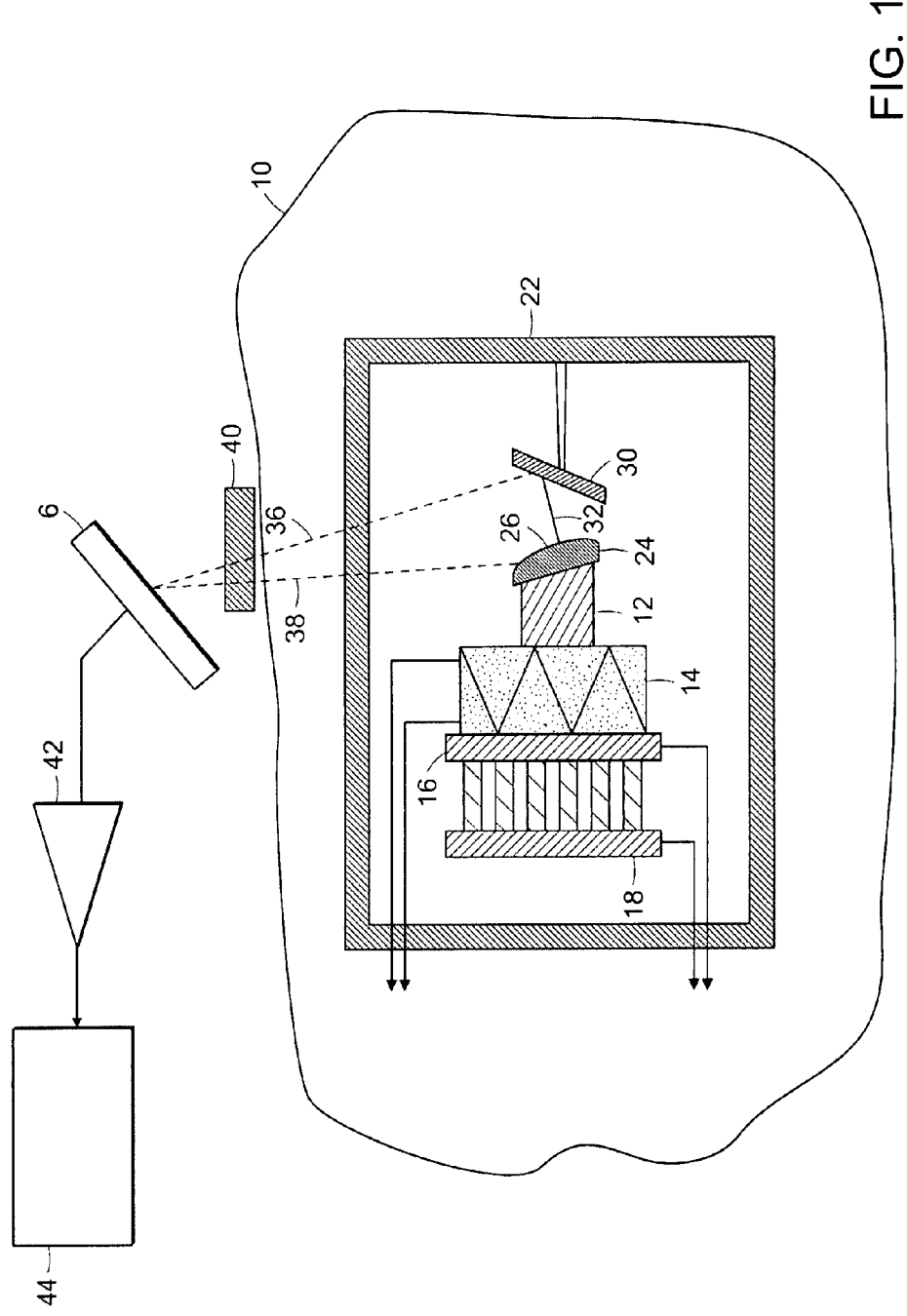
FIG. 1 is a schematic cross-section of a device for calibration of detectors of penetrating radiation in accordance with preferred embodiments of the present inventions.

In accordance with preferred embodiments of the present invention, solid state devices are used to provide electrons of sufficient energy to produce characteristic x-rays for calibrating energy-dispersive x-ray and y-ray detectors. In accordance with preferred embodiments of the invention, a pyroelectric crystal is used to accelerate electrons to requisite energies.

Pyroelectric crystals have been known for more than a century. With a primitive lattice cell belonging to one of the point groups ($C_n$, (n=1 ... 6), $C_{nv}$, (n=2 ... 6) and $C_{1h}$) that can sustain a dipole moment under the symmetry operations characterizing the point group, each unit cell can sustain a dipole moment in its equilibrium state. While ordinarily shielded by stray electrons, these dipole moments can give rise to a bulk polarization during heating or cooling of the crystal, as the net electrostatic asymmetry changes faster than surface charges can respond. Pyroelectric crystals are therefore used, for example, as temperature gauges and infrared sensors, since heating them produces a measurable voltage on their surface. Pyroelectrics notably include lithium niobate, lithium tantalate, tourmaline, and cesium nitrate.

Pyroelectric crystals have been shown to generate x-rays when heated or cooled, in atmospheres of gas at partial vacuum, in the range of ~$10^{-3}$-$10^{-2}$ Torr, as described, for example, by Brownridge and Raboy, Investigation of Pyroelectric Generation of X-Rays, J. Appl. Phys., vol. 86, p. 640 (1990), and Brownridge, Pyroelectric X-Ray Generator, Nature, vol. 358, pp. 287-88 (1992), both of which references are incorporated herein by reference. Heating or cooling may produce fields up to ~1MV/cm, and at reduced gas pressure, the surrounding gas is ionized and electrons are accelerated towards the positive crystal face, while ions are accelerated away from the positive crystal face. Impinging on the crystal surface, the electrons generate both characteristic x-rays and bremsstralung. Crystals of $LiNbO_3$ and $LiTaO_3$ heated to 160° C. in dilute gases produced x-rays up to 170 keV.

Pyroelectric crystals, thus, produce x-rays when they are heated or cooled. The total number of x-rays emitted during a cycle is sufficient for calibration but not so substantial as to be a radiation concern.

Other effects can give rise to large local separation of charge and generation of substantial electric fields across crystals, and their use is within the scope of the present teachings. Piezoelectric crystals, for example, have no ground state dipole moment, but, when bent, the lattice is deformed and they can produce a voltage sufficient to cause a spark; typical gas grills use them to ignite the propane.

In accordance with preferred embodiments of the present invention, a device, referred to herein as a pyroelectric calibrator or PyCal™, incorporates one or more polarizable crystals in a tenuous gaseous medium, and, typically having no moving parts, is inexpensive to build, needs little space and minimal power for calibrating the x-ray response of a detector. PyCal™ may be used particularly advantageously for battery-operated x-ray fluorescence instruments.

The present invention uses a pyroelectric crystal to produce characteristic x-rays for calibrating energy-dispersive x-ray and y-ray detectors. The total number of x-rays emitted during a cycle is sufficient for calibration but not so substantial as to be a radiation concern.

This new calibration method has several advantages: First, in contrast to radioactive sources the new method eliminates the need for licensing of expensive, highly regulated radioactive materials. Second, compared to x-ray tubes, the new method eliminates the need for both an external electron source or a high voltage source since the high voltage is generated from within the pyroelectric crystal itself and the electrons are from the surfaces of constituent materials. Third, the x-ray calibrator in accordance with the present invention can be very small, allowing instrument designers to optimize geometry and overall form factors. Fourth, the pyroelectric calibrator is turned on and off electronically and can be placed inside the x-ray detector envelope in an integral package.

When one surface of the crystal is heated, Brownridge found that a strong positive electric field is produced on the opposite surface. The positive field attracts electrons to that surface, generating x-rays characteristic of the surface material. When the hot surface cools, the electric field on the opposite surface reverses so that electrons are ejected from that surface and produce x-rays characteristic of an external target material.

Brownridge's devices are available for use in classrooms to teach the fundamentals of x-ray interactions, but their attributes are limited at this time: The duration of the x-ray production is short; the ratio of x-ray on-time to total time (the duty factor) is low; the intensity is not constant over time; and the voltage and intensity of the electron output is not reproducible. While disadvantageous for many commercial applications, these features allow for the use of pyroelectric devices for energy calibration of x-ray detectors since energy calibration depends only on providing sufficient intensities of known x-ray energies so that the energy calibration can be carried out in acceptable times. The intensity need not be constant during a calibration or from one calibration to a later calibration. Available pyroelectric devices already developed satisfy the intensity requirement for calibrating devices in less than 20 seconds; in some detectors the calibration can be done in a few seconds.

Examples are now presented of embodiments of the present invention for calibration of penetrating radiation detectors. Two methods are presented that are useful for x-ray fluorescence (XRF) analytic instruments that require that the energy calibration of the x-ray detector, such as a silicon PIN diode or a CdTe semiconductor, be accurate and stable. Accuracy and stability to about one part in a thousand is often needed to identify the elements in the target by their characteristic x-ray emission spectra. These methods are illustrative and do not exhaust the scope of the present invention.

Referring, first, to FIG. 1, elements are shown of a pyroelectric device for calibrating the energy scale of an x-ray detector 6. The pyroelectric device 10 consists of a pyroelectric crystal 12 (such as a Z-cut crystal of $LiTaO_3$) on a substrate 14 that can be heated by an ohmic heater 16 or cooled by a Peltier-effect cooler 18. Device 10 is in a hermetically sealed can 22, for example a TO8 package, at a suitable pressure of surrounding gas less than 8 milliTorr. Any gas may be used, though it is preferable that the gas not significantly condense over the pressure and temperature range of operation.

The top face 24 of the crystal 12 has a coating 26 of a suitable radiating material. Examples of suitable radiating material include a 2 μm layer of iron. An electrically conducting foil 30 is at an electrical potential different from that of top face 24 of the crystal, typically at ground potential, and is disposed in front of the top face 24. Foil 30 may be the same material as coating 26 or may be a different material. Foil 30 may be silver, for example, and a typical thickness of foil 30 is 20 μm. Electrons 32 will flow to or from the coating 26. When the electrons flow to the coating 26, from the foil 30, they generate x-rays characteristic of that material. When the electrons 32 flow away from coating 26, they impinge on the foil 30 generating x-rays characteristic of that foil. The material of the coating 26 and the foil can be chosen to give the monoenergetic x-rays 36 and 38 suitable for calibration. An absorber 40, chosen by methods well known in the art, and including, for example, iron, when the radiating material 26 or 30 is iron, will generally be placed to intercept the x-ray beams 36 and 38 so as to enhance the intensity of the monoenergetic x-rays over the continuum of x-rays produced by the electron beams. The absorber disposed to minimize the bremsstrahlung spectrum will typically be of the same material as the generator of the lower energy calibration x-rays. The calibration x-rays 36 and 38 are detected by the detector 6, which generates a detector signal, amplified by amplifier 42 and processed by a processor 44 to calibrate the detector's response from the precise knowledge of the energies of the monoenergetic, characteristic x-rays emitted by the coating 26 and the foil 30.

Figure 2:
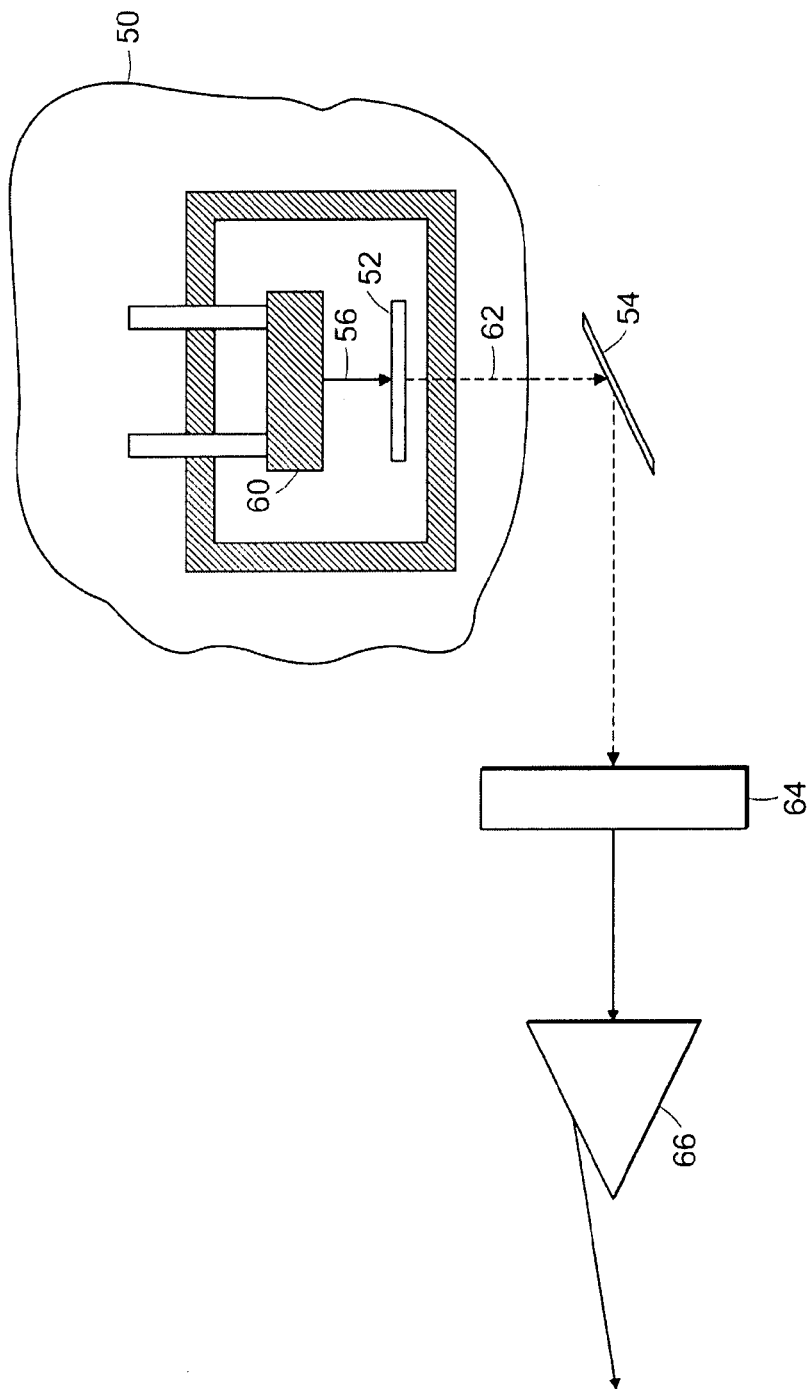
FIG. 2 is a schematic cross-section of a device for calibration of detectors of penetrating radiation in accordance with preferred embodiments of the present inventions.

FIG. 2 illustrates a second embodiment of the invention, in which the PyCal™ is characterized by an external calibration foil 54. Pyroelectric device 50 contains the pyroelectric crystal 60 and other key elements of the device 10 of FIG. 1 except that the internal foil 52 is used primarily as a generator of the x-ray continuum, the so-called bremsstrahlung, 62, with a maximum energy equal to the energy of the electron beam 56. The continuum x-rays 62 strike a target foil 54, external to the device 50. The easily changed external target makes it practical to vary the calibration energies for different applications.

In accordance with other embodiments of the invention, the solid-state x-ray calibrator is co-disposed, inside the same housing as an x-ray detector, making a miniature detector package that contains its own calibrator. This dictates a pressure regime within the detector housing that would not otherwise be maintained. In accordance with this embodiment, the PyCal™ is placed inside the sealed package that contains the x-ray detector and associated temperature control device, used for XRF measurements.

A further application of calibration using pyroelectric crystals, not illustrated here, makes direct use of the bremsstrahlung x-ray beam, which contains no monoenergetic x-ray components. Electronic radiation dosimeters require periodic calibration, typically the instruments are sent to an appropriate laboratory once a year for such calibration. A pyroelectric crystal that produces a reproducible radiation dose is particularly useful for daily, in situ, calibration to ensure the integrity of measurements between yearly laboratory calibrations.

Figure 3:
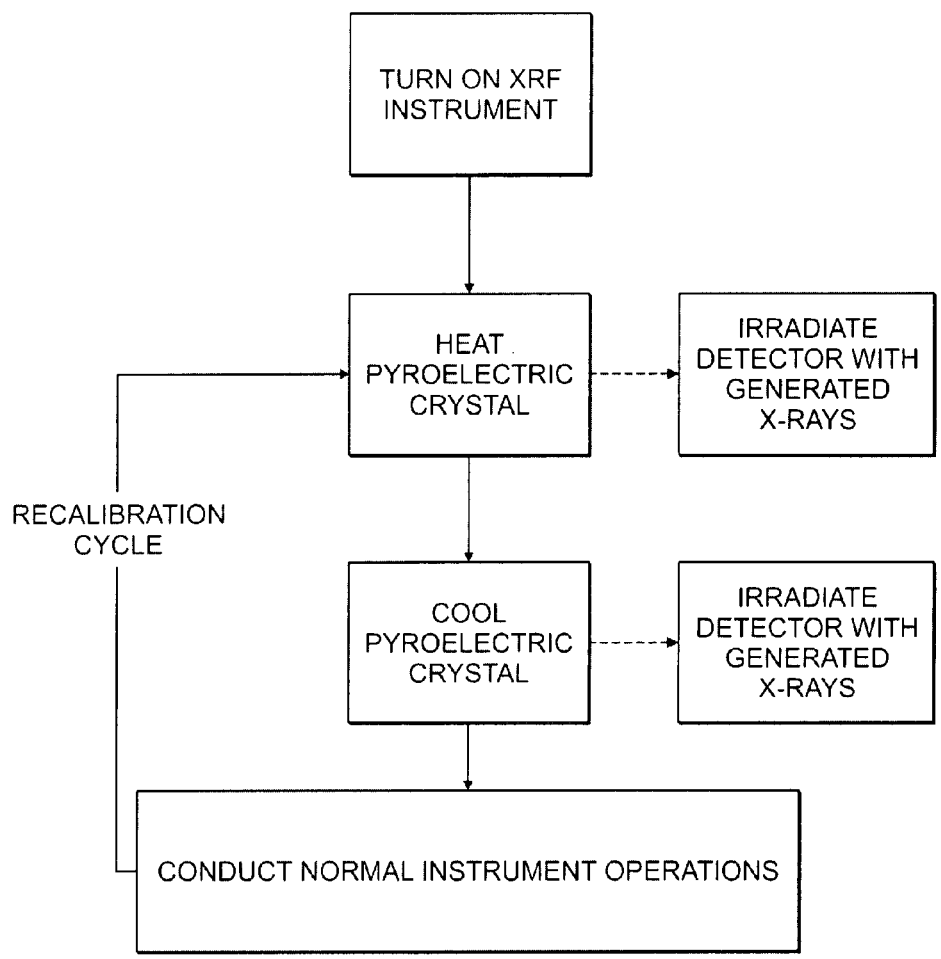
FIG. 3 is a flow chart depicting steps for calibrating a detector of penetrating radiation in accordance with embodiments of the present invention.

An embodiment of the invention is now described with reference to FIG. 3. The device shown in FIG. 1 is assumed, for purposes of discussion, where the silver foil 32 produces K x-rays of 22.10 keV and 25 keV when the crystal face 12 cools, while the iron coating 26 produces 6.40 keV and 7.06 keV x-rays when the crystal 12 face heats. Both spectra are detected in the silicon PIN diode 6. A 10 to 30 second heating followed by a 10 to 30 second cooling produces sufficient x-rays for calibrating the silicon PIN diode.

The calibration procedure is as follows. The XRF instrument is turned on. A few seconds later, the calibration of the XRF detector (e.g., a silicon PIN detector) by the PyCal™ is initiated. A single cycle of the PyCal™ of FIG. 1 consists of a heating for from 5 to 10 seconds followed by a cooling of about 5 to 10 seconds. Between 20,000 and 50,000 counts are typically obtained in the principle peaks of 22.10 keV and 6.40 keV, sufficient to accurately calibrate the energy scale of the detector and pulse processing electronics. The signal generated by the detector is compared with the known energy content of each x-ray photon emitted. The calibration consumes little energy and is quick enough so that it can be done periodically during the day, if that is desired.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method for calibrating energy response of x-ray and gamma-ray detectors in order to provide for determining an energy characterizing an incident photon of otherwise unknown energy, the method comprising:

enclosing a polarizable crystal characterized by a temperature within a partial vacuum in a hermetically sealed enclosure;

inducing a voltage between one face of the crystal and a foil held at an electrical potential different from that of the face of the crystal;

interposing a target between the face of the crystal and the detector for generating characteristic x-rays of specified energies;

accelerating charged particles between the foil and the face of the crystal so that the charged particles impinge upon one of the face of the crystal and the foil to generate penetrating radiation of known energy characteristics;

directing the penetrating radiation onto a penetrating radiation detector thereby generating a detector signal; and calibrating the detector signal on the basis of the detector signal and the known energy characteristics of the penetrating radiation, such that the energy characterizing the incident photon of otherwise unknown energy is determined solely on the basis of the foregoing procedure.

2. A method in accordance with claim 1, wherein the step of enclosing a crystal includes enclosing a crystal chosen from the group of pyroelectric crystals including lithium niobate, lithium tantalate, and cesium nitrate.

3. A method in accordance with claim 1, wherein the step of enclosing a polarizable crystal includes enclosing a pyroelectric crystal.

4. A method in accordance with claim 3, wherein the step of inducing a voltage between one face of the crystal and the foil includes changing the temperature of the crystal.

5. A method in accordance with claim 1, wherein the target is disposed within the hermetically sealed enclosure.

6. A method in accordance with claim 1, wherein the target is disposed outside the hermetically sealed enclosure.

7. A method in accordance with claim 1, wherein the penetrating radiation detector is disposed with the hermetically sealed enclosure.

* * * * *